Oct. 6, 1970 P. J. GRIPSHOVER ET AL 3,531,848
FABRICATION OF INTEGRAL STRUCTURES
Filed Jan. 10, 1966

*INVENTORS*
PAUL J. GRIPSHOVER &
HUGH D. HANES
BY *Gray, Mase & Dunson*

ATTORNEYS

– Patented Oct. 6, 1970

3,531,848
FABRICATION OF INTEGRAL STRUCTURES
Paul J. Gripshover and Hugh D. Hanes, Columbus, Ohio, assignors to The Battelle Development Corporation, Columbus, Ohio, a corporation of Delaware
Filed Jan. 10, 1966, Ser. No. 519,560
Int. Cl. B22f 3/24
U.S. Cl. 29—420.5                                10 Claims

ABSTRACT OF THE DISCLOSURE

A method of producing integral structures having solid and hollow regions comprising arranging a plurality of mandrels in spaced relation in a rectangular yoke, filling the spaces between the mandrels and the yoke with a powder material different than the mandrel material, welding top and bottom cover plates on the yoke, rolling the yoke to a predetermined thickness, and selectively removing the mandrels.

---

This invention relates to the fabrication of internal metal structures, and more particularly to a method of fabricating finished metal structures from a starting blank including a purposefully arranged metal powder component.

Numerous difficulties have arisen in the fabrication of metal structures having complex geometries. Foremost among the types of complex structures requiring difficult fabrication procedures are the metal reinforced structures commonly used as structural components where a high ratio of strength to weight is desired. Considerable recent attention has been focused on the use of the aforementioned structural components for aircraft, missiles, and space vehicles. One of the more common metal reinforced structures is the "sandwich structure" comprising metal reinforcement disposed between two face plates. The metal reinforcement may have a truss, honeycomb, rib or other configuration. Another common structure is the stiffened skin structure wherein metal reinforcements as "stiffeners" are disposed at various locations on the surface of a single sheet or "skin."

The present invention as several advantages in the fabrication of metal-reinforced structures specifically hereinafter described and particularly where the structures have nonsymmetical configurations. However, it is not meant to be limited thereto, and it is also useful in the fabrication of almost any metal structure wherein a portion of the interior of said structure defines an internal cavity or hollow portion.

The customary approach to the fabrication of metal structures characteristic of the metal reinforced structures has included a number of widely different techniques wherein the principle objective is to metallurgically unite two or more separate components in a manner so as to provide a sound structure. The integrity of the entire structure is dependent on a strong bond between components. Adhesive bondings, brazing, and some welding processes have been used to achieve bonding by the use of an intermediate bonding agent. Adhesive bonding is restricted to applications where the structure will not be used in a high temperature environment. Brazing requires careful assembly and cleaning of all mating surfaces and results in a product known to be characterized by a low joint efficiency. Welding is time consuming and expensive and includes the limitation of inaccessibility of joint areas inherent in brazing and adhesive bonding. In addition, welding often leaves a metallurgically undesirable heat affected zone that may have an embrittling effect on the structure.

One method for the fabrication of metal reinforced structures that has met with some success is described in U.S. Pat. No. 3,044,160 (Jaffee). In this method, material to be welded and suitable filler bars are enclosed within a pack and reduced by hot rolling to form a continuous bond between the material components. Still another process based on the use of elevated pressures and high temperatures to achieve a solid state bonding of components is gas-pressure bonding. In this method, a pack of components and filler bars is confined within an autoclave operating at elevated temperature and pressure. The size of the structure produced is limited by the size of the autoclave that can contain the same.

While the latter two processes overcome the problem of inaccessibility of joint areas, it is still necessary to provide carefully calculated tolerances at all metal interfaces to avoid intrusion of filler bars. In addition, all of these structures are characterized by the need to form a bond having the same structural integrity as the metal. Whenever fabrication depends on bondnig, it is necessary to carefully clean all mating surfaces, maintain the clean parts after cleaning, carefully contact the parts, provide a suitable atmosphere, and subject the materials to time and temperature conditions suitable for bonding but not necessarily suitable to achieve optimum properties in the metal. In addition, some difficulty arises where nonsymmetrical metal members must also be bonded to the structure or circuitous passages must be provided for lubricant flow, coolant flow or electrical conduits. Further, structures of the type being considered often should be provided with generous fillets at metal interfaces. Known methods of fabrication cannot always furnish these fillets economically. The respective metal components whether sheet, plate, ribs, etc. have to be fabricated from molten metal or powder and carefully machined to size prior to the bonding step.

Presumably, the ideal method for preparing the above-described structures is one that would provide an integral structure produced directly from molten metal or metal powder. Unfortunately, the thin sections and complex configurations required for the structural components having a high ratio of strength to weight are not amenable to powder metallurgical fabrication by conventional pressing and sintering. In addition, extremely large pressure applying means would be required. Melting and casting are also limited by the thin sections and, where refractory metals are used, by the further limitation of need to cast under special atmospherte or vacuum. The metallurgical structure produced by powder metallurgy or casting is not the best for structural applications. The optimum metallurgical structure exists in wrought metal, which must be bonded to obtain structural shapes.

Accordingly, it is an object of this invention to provide a process for the preparation of an integral metal structure.

It is a further object of this invention to provide a process for the preparation of an integral metal structure having a high strength to weight ratio.

It is a still further object of this invention to provide a process for the preparation of an integral metal structure having the properties of a wrought metal structure.

It is another object of this invention to provide a process for the preparation of an integral metal structure having a high strength to weight ratio and characterized by a configuration including the presence of nonsymmetrical components and symmetrical components.

It is still another object of this invention to provide a method of fabricating a metal reinforced structure.

It is yet another object of this invention to provide a method of fabricating a metal reinforced structure characterized by the presence of inaccessible joint areas.

It is yet still another object of this invention to provide a method of fabricating metal reinforced structures wherein the method is characterized by the absence of extensive metal cleaning procedures.

It is a further object of this invention to provide a method of fabricating metal reinforced structures wherein the properties of the metal can be controlled during fabrication.

It is a still further object of this invention to provide a method of fabricating metal reinforced structures wherein narrow tolerances are not required between metal parts undergoing fabrication.

It is another object of this invention to provide a novel method of fabricating metal reinforced structures characterized by the presence of fillets.

This invention describes a new method of producing a metal fabrication characterized by an integral structure. The method of this invention provides several advantages in comparison with other known methods and further provides a product having many advantages that result from the novel process described herein.

The foremost advantage is that no bond is required between the various metal components as the structure is integrally formed during the fabrication process. The complete lack of a metallurgical bond is what is meant when the structure is referred to as an integral structure. As a result of the absence of a need for a bond, no special surface preparation is required and properties are not dependent on the temperature or pressure applied during fabrication. In many cases, particularly for refractory metals, starting materials are relatively inexpensive thus contributing to the overall economy that is realized by the process. Composite materials such as cermets, dispersions, or fiber and filament reinforced materials are easily handled by the process.

In addition to the advantages resulting from absence of a need for bonding, structures having larger sizes and thinner cross-sections can be fabricated than is possible with presently available methods for making integral structures. High production rates can be achieved and excellent mechanical properties are inherent in the final product.

A variety of structures can be produced. These include metal reinforced sandwich structures such as truss core, rectangular cell, hexagonal cell, vertical rib and other modifications as well as stiffened skin configurations. Structural elements such as I-beams, H-beams, and L-beams may also be produced. Structures of the kind hereinabove described find widespread use in pressure vessels, presurized fuel tanks, solid propellant engine cases, and space vehicle and aircraft structures of many kinds.

The foregoing and other objects, advantages and features of the invention are attained by the method illustrated and described herein.

Figure 1:
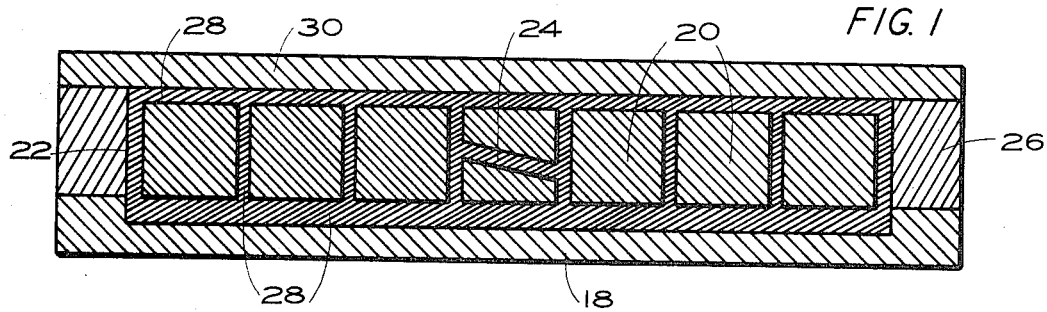
FIG. 1 is a vertical cross-sectional view of an assembly ready for fabrication according to the invention.

The present invention includes the preparation of a blank comprising a confining assembly surrounding and enclosing a solid comprising definite purposefully arranged regions of two different materials wherein at least a portion of one of the materials is a powder and subjecting the prepared blank to rolling pressure.

In preparing an assembly according to the invention, a structural material and a mandrel material are arranged in a confining assembly comprising a frame and cover sheet and having at least one open end. As used herein, structural material refers to a material at least a portion of which is a powder and mandrel material refers to a material different from the powder. The location of the structural material corresponds to areas that will be solid in the final structure and the mandrel materials are placed in areas that will define void areas or hollow portions in the final structure. The location of the respective materials is governed to a large degree by the geometry of the configuration ultimately desired and to a smaller extent by geometric factors related to the fabrication procedure. These latter factors include the degree of reduction to which the assembly will be subjected, the direction of rolling, and the degree to which components initially comprising powder will be densified. Location can be readily accomplished for any given system by routine calculation. Layup of the assembly presents no difficulty. Vibration or other agitation can be used to assist the flow, packing, and distribution of powders. Packing of powder in the container and around the mandrel may be assisted by tamping the powder with a blunt instrument. Maintenance of the proper geometry of the mandrel materials during lay-up can be facilitated by the use of various types of locating jigs that can be readily removed after mandrels become permanently embedded in the powder or that can be left in the pack during subsequent rolling. Special fixtures attached to the confining assembly or clamps suspended thereabove may also serve as adequate locating jigs. It will be apparent that the exact type of locating jig used to facilitate the lay-up will be dependent on the geometry sought for the final structure. Upon completion of the lay-up, a cover is welded to the frame of the confining assembly. Electron beam welding can be done in vacuum so as to assure adequate removal of gas from the blank and protection of materials from oxidation during subsequent operations. Where electron beam welding is not feasible, the confining assembly can be welded shut by other known methods and gas is removed from the blank through a suitable port affixed to the confining assembly and communicating with the interior of the blank. Because the blank is outgassed, no special atmosphere is required during later forming at elevated temperatures.

The structural material can be in any form suitable for subsequent consolidation. This includes milled powders of angular or irregular shape, flake powders, teardrop shape powders, spherical powders, spongy powders, and crystalline, dendritic or fernlike powders. Dispersants, fibers, whiskers and filaments can be incorporated with the powder. In addition, mixtures of more than one powder can also be used. A portion of the structure may comprise one material while still another portion may comprise a second material. For example, a sandwich structure would comprise face plates of two different metals and ribs of a third metal. Areas of the structure surrounding conduits carrying corrosive fluids can be made from a corrosion-resistant material while the remainder of the structure comprises a stronger or less expensive material. Beryllium is an example of a class of structural materials particularly amenable to the method of this process. The wrought forms of these materials are normally produced directly from powder. Thus, the present process eliminates the duplication of steps present when the wrought forms are bonded by conventional techniques and in this manner provides certain economies. In cases where an area to be filled with structural material is inaccessible and powder does not flow readily therein, a solid material of the same composition as the powder is placed in "hard to fill" areas. Thus, while a majority of the structural material is a powder, there are circumstances where solid material of the same composition is used therewith. Because of the large surface area of powder, bonding of powder and solid material is easily done.

The mandrel material serves only to provide a solid blank for rolling and is later removed to define an internal cavity of the structure. The mandrel material is selected to be compatible with the structural material during the subsequent processing steps so as not to adversely affect the ultimate configuration desired for the structure or the properties thereof. This means that the mandrel and structural material should be relatively nonreactive with one another and at the same time have comparable mechanical and physical properties. By the latter, it is meant that materials should behave similarly while being rolled and should have approximately matched coefficients of thermal expansion. Where the configuration of the structure is such that the mandrel material is selectively removed by chemical leaching upon completion of the forming operation, materials must be selected so that the structure will not be attacked by the chemical leachant dissolving the mandrels. The mandrel may comprise a powder or partially densified powder. In large structures, this will allow the structure to densify uniformly upon fabrication. If this is not done in the case of large blanks, there is danger of cracking upon densification of a structural material confining a plurality of solid mandrels. If there is danger of excessive reaction between the mandrel and the structural material, the mandrel can be coated with a diffusion barrier such as certain known oxides having high negative free energies of formation. The following is a listing of examples of compatible materials that may be used according to the invention:

| Structural material: | Mandrel |
| --- | --- |
| Titanium | Iron or steel. Cooper. |
| Refractory super alloys | Low carbon iron. |
| Columbium, tantalum or tungsten. | Molybdenum. |
| Molybdenum | Steel coated with ceramic. |
| Stainless steel | Low carbon iron. |
| Nickel alloys | Low carbon iron. |

Where metals are referred to in the above list, it is, of course, meant also to include alloys thereof. Although the method of this process provides the most utility for metal powders, any material capable of being rolled without excessive cracking can be used for the structural material or the mandrel.

Conditions for rolling the assembled blank will be determined by the general characteristics of the materials and thus generally will be different for each material. The optimum conditions for rolling various alloys may be determined by routine experimentation where not already known. An important feature of the present invention is that the rolling schedule can be selected on the basis of producing optimum mechanical properties and high material yields and is not limited by requiring elevated temperatures to form a bond. In fact, for certain materials with some of the processing steps to be hereinafter described, cold rolling or merely rolling at warm temperatures may be feasible.

Upon completion of the rolling operation, the finished blank can be subjected to additional forming operations such as bending, etc. In any event, when the final structural configuration is achieved, the confining assembly is removed from around the structure and the mandrels are selectively removed from the structure by any convenient means. The confining assembly is readily removed by cutting off the frame and striking the cover sheets with a hammer or other instrument. When the internal cavity defined by the mandrel is tortuous or relatively inaccessible, chemical leaching is used to remove the mandrels. In simple configurations, mechanical removal by striking with a hammer or application of tension is feasible where little or no bonding has occurred with the structural material. Lack of bonding is assured in some circumstances by the hereinbefore discussed method of applying a coating of a diffusion barrier on the surface of the mandrel prior to insertion in the blank. In other circumstances, a mandrel having high elongation properties can be removed by application of tension to the ends of the bars. In the majority of situations, removal of mandrel material is done by chemical leaching. Under some circumstances, the entire blank can be placed in the leachant and the confining assembly removed therefrom by the action of the leachant. Generally, the leachant is an acid that is pumped into the core and circulated through an appropriate manifold device.

The sequence of operations including a rolling schedule initially selected to insure maximum mechanical properties and the proper degree of reduction will not always densify the structural material adequately. Metals that are brittle should be at substantially 98 to 100 percent of theoretical density prior to rolling. More ductile metals can be at lower density when rolled. Beryllium is one of the class of materials that must be at substantially 98 to 100 percent of theoretical density prior to rolling. One method of assuring adequate preliminary densification is conventional hot pressing. It has been discovered, however, that generally the best preliminary densification is provided by hot isostatic pressing (gas pressure bonding). In this method, the welded blank is placed in an autoclave and subjected to high gas pressure at elevated temperature. Hot isostatic pressing has been found to allow the use of lower temperatures than are required in conventional hot pressing while at the same time providing high density, fine grain size and minimal reaction with the mandrels. It has been found further discovered that preliminary densification and properties of the final structure can be enhanced even further by a first hydropressing step. This can be done with or without hot isostatic pressing. When hydropressing, the lay-up of structural material is made in a confining assembly of elastic material such as rubber or polyvinyl chloride. The internal dimensions of the elastic confining assembly approximate those of the metal confining assembly used in subsequent fabrication steps. Attached covers of elastic material complete the assembly and it is placed in oil or other fluid medium and subjected to high pressure. The elevated pressure is transmitted hydrostatically so that the powder components densify evenly without being adversely affected by the mandrels that may be dispersed in the powder at nonplanar locations. After the hydropressing, the rubber envelope is removed and the hydropressed material is placed in a confining assembly that is welded shut for subsequent processing.

Instead of bending a flat rolled blank into a cylinder and welding the abutting edges, a seamless hollow cylindrical shape having longitudinal or transverse ribs can be made in an embodiment using the combined steps of hot isostatic pressing and rolling. In this embodiment, respective layers of structural material and mandrels are located within the space between coaxial tubes. End plates are welded to the filled areas and the assembly is ring rolled. In ring rolling, the tubular shaped assembly is fed vertically and rotated in a roll gap defined by inner and outer vertical rolls.

In the embodiment of the invention illustrated in FIG. 1, a bottom cover 18 has a frame 26 resting on the upwardly extending portions at the periphery thereof. A structural material 28 is interposed in the space between the bottom cover 18 and a plane through the base of the mandrels 20. The lateral space defined between the mandrels 20 is filled with structural material 28. Additional structural material 28 covers the top of the mandrels so that the entire space inside frame 26 is filled with structural material 28 and mandrels 20. A top cover 30 is placed on the entire assembly and is welded to frame 26. Where required by the properties of the structural material, the assembly can then be consolidated by hot isostatic pressing. In any event, the blank as assembled in FIG. 1 is subjected to the heat and pressure of the rolling mill. After rolling, the frame and cover sheets are disassembled from the blank and the mandrels 20 are selectively removed. The resulting configuration is an integral vertical ribbed reinforced sandwich structure. As shown in FIG. 1, a horizontal stiffening rib 24 can also be included or where desired from a structural point of view, a plurality of horizontal stiffening ribs may be used by the method of this process. Where desired, the top layer of structural material covering the top surface of the mandrels 20 may be eliminated to provide a stiffened skin structure. It will be appreciated that in the latter case removal of mandrels 20 upon completion of rolling will be considerably easier.

Figure 2:
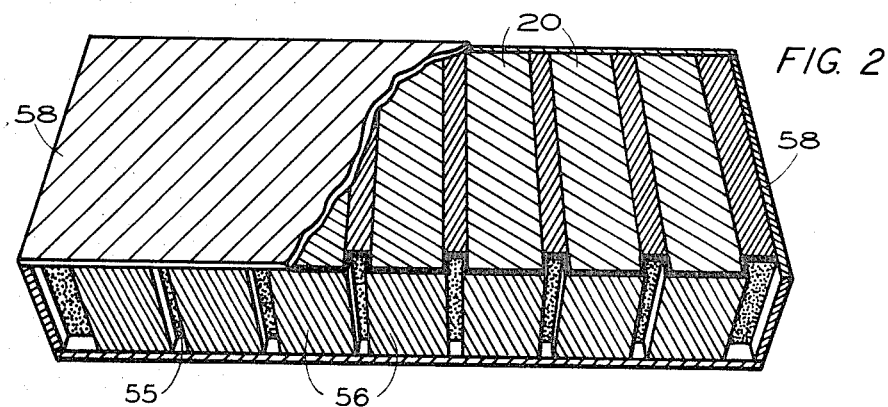
FIG. 2 is a perspective view of a means for laying up the assembly of FIG. 1.

In the assembly of the structural portion of FIG. 1, alternate layers of structural material and mandrel material can be placed in the confining assembly in a manner similar to the make-up of a cored sand mold for metal casting. In making the lay-up, reference points can be marked on the frame to assure proper relative location of the component materials. One form of locating jig to facilitate lay-up and proper location is shown in FIG. 2. The locating jig comprises a top spacer plate 56 having notched portions 55 snugly engaging the mandrels 20 to insure their separation at the defined distances. The spacing portions 55 of top spacer plate 56 are perforated so as to allow powder to flow therethrough. The assembly comprising mandrels 20 and spacer plate 56 is located in an open end container 58 and powder is passed through the perforations in the spacer plates and is vibratorily packed about the mandrels. When a sufficient depth of powder has built up in the container, the packed powder serves to maintain the mandrels in their spaced positions and top spacer plate 56 is removed. To produce the structure of FIG. 1, additional powder is then added to cover mandrels 20. Where desired, the container 58 serves as the confining assembly during subsequent processing. In other cases, container 58 is disassembled and the composite of powder and mandrels placed in a suitable confining assembly. To aid removal, a parting compound can be spread on the spacer plates prior to assembly. When hydropressing is used, container 58 is an elastic material.

Figure 3:
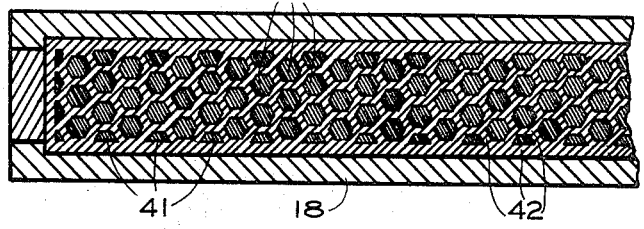
FIG. 3 is a vertical cross-sectional view of another assembly ready to be fabricated according to the invention.

In FIG. 3 a sandwich structure comprises reinforcing in a multi-play hexagonal cell configuration suitable for heat exchange devices and the like. The blank is prepared in one embodiment in the same manner described in connection with FIG. 1 by first spreading a uniform layer of structural material 42 across the depressed portion of the bottom cover plate 18. Pyramidal shaped mandrels 41 are placed in spaced relationship on the bottom layer of structural material 42. Additional structural material is spread in the lateral spaces defined by mandrels 41 and hexagonal mandrels 40 are placed thereon and additional structural material 42 is spread. In this way, the structure is built up to the assembly shown in FIG. 3. In an easier and more accurate method of laying up the assembly, the mandrels are suspended from the ends of slidably removable locating end plates having openings matching the shape of the ends of the mandrels. When sufficient powder is spread to lock in the mandrels, the end pieces are slidably removed, additional powder is added, if desire, and the assembly is ready for fabrication. Where open channels run the full length of a structure as in FIGS. 1 and 3, suitable locating guides can be provided in the frame of the confining assembly of the blank. In other arrangements, the locating grids need not be removed and can be fabricated along with the blank. Where location of mandrels is difficult, pins affixed to the mandrel and having the composition of the structural material can be used to fix the location of the mandrels in the blank. Where both the structural material and the mandrel are powders, or where the structural material comprises two powders each in a different location, a thin rigid separator sheet can be used to maintain the distinct locations during lay-up. After each layer of powder is built up to its desired dimension, the separator sheet is withdrawn from the structure being assembled. From the discussion in connection with FIGS. 2 and 3, it will be obvious that numerous simple techniques are available to facilitate accurate lay-up of the blank.

Figure 4:
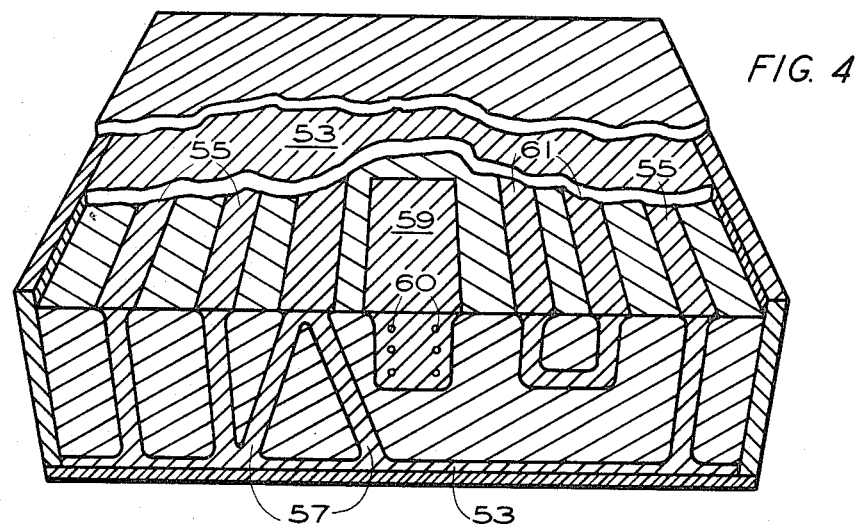
FIG. 4 is a perspective view of still another assembly ready for fabrication according to the invention.

In FIG. 4, an example of a complex configuration demonstrates the versatility of the structures that can be produced by the method of this process. The structure includes the face plates 53, vertical ribs 55, truss ribs 57, a mounting boss 59 and a channel 61. Mounting boss 59 does not run the full width of the pack and is provided with conduits 60 for carrying electrical leads or fluid. Channel 61 can serve as a mounting boss, as a carrier for electrical cable and the like, or as local reinforcing means. Generous fillets can be provided at important areas simply by using mandrels having appropriately rounded edges.

EXAMPLE 1

A vertical rib structure of the type shown in FIG. 1 was made from beryllium. Copper mandrels having dimensioned of 1/4-inch–1 3/4 inch x 4 inches were fixed in a locating jig comprising a top perforated notched spacer plate and a parallel bottom notched spacer plate so as to define a space of 3/16-inch between mandrels. The mandrel assembly was then confined within a vacuum formed rubber frame having dimensions of 2 3/4 inches x 2 7/8 inches x 4 inches. Beryllium powder passed through the perforations in the top spacer plates and was vibratorily packed around the mandrels. Following removal of the top spacer plate, beryllium powder was packed to a depth of 1/2 inch above the mandrels. The compacted assembly was then turned over, the bottom spacer plate removed from the mandrels and powder was again packed to a depth of 1/2 inch above the mandrels. Top and bottom rubber covers were heat sealed to the rubber frame and the entire assembly hydropressed at 60,000 p.s.i. The pressed composite was removed from the rubber envelope and placed within a confining assembly of mild steel. Following welding of cover plates, the blank thus formed was preheated to 800° F. and then subjected to hot isostatic pressing for 2 hours at 1400° F. and 15,000 p.s.i. At the end of 2 hours, gas pressure decreased to atmospheric while temperature remained above 1000° F. The blank was then transferred to a larger steel yoke and cover plates welded to three sides thereof. The heavy yoke was included to provide edge-wise compression during rolling. The assembly was then hot-rolled at 1450° F. at about 7 percent reduction per pass after a few light passes were taken to insure seating of components. Rolling direction was reversed occasionally and a reduction ratio of 3 to 1 was finally achieved. The resulting sandwich was leached in nitric acid (67 percent $HNO_3$) at about 120° F. Samples from the rib-face plate interface were taken for examination of microstructure and showed a uniform integral structure.

High quality solid composite metals can be made by using the embodiment of this invention wherein a blank is subjected to hot isostatic pressing prior to rolling. These composite metals are useful in applications where the beneficial characteristics of two metals are desired in a multi-metallic structure. In producing composite metal shapes by the method of this process, a blank is prepared comprising two or more different metal layers wherein at least one of the metals is a powder. The blank is subjected to hot isostatic pressing, rolled and removed from the pack. Where the metal powder must be firmly consolidated prior to rolling, a first hydropressing step can be used. The present method has particular advantage because much less emphasis need be placed on achieving a bond than in known processes for making composite metal shapes. The variables of the fabrication process can be controlled so as to produce the best properties in the two or more different metal layers.

The foregoing description illustrates that a novel and unique method for fabrication of structures has been provided wherein a specially prepared solid blank of two or more different materials, at least one of which is a powder, is subjected to rolling pressure to produce an integral structure.

It will be understood that various changes in the details, materials, steps and arrangements of parts, which have been herein described and illustrated may be made within the principles and scope of the invention.

What is claimed is:

1. A method of producing integral structures having solid and hollow regions comprising:
    (a) arranging a plurality of mandrels in spaced relation to one another in a rectangularly shaped metal yoke;
    (b) filling at least the majority of the spaces between the mandrels and the yoke with a powder material, said powder material being different than the mandrel material;
    (c) filling any remaining spaces between the mandrels and the yoke with solid structural material, said solid material being the same as the powder material;
    (d) welding top and bottom cover plates on the yoke;
    (e) rolling the yoke to a predetermined thickness, and
    (f) selectively removing the mandrels.

2. The method of claim 1 wherein the mandrels are also formed of a powder material.

3. The method of claim 1 wherein said powder material is selected from the group consisting of metal powders, metal alloy powders, composite powders, cermet powders, dispersion powders, fiber reinforced powders, and filament reinforced powders.

4. The method of claim 1 wherein said powder material has a coefficient of thermal expansion approximately equal to that of the mandrel material.

5. The method of claim 1, with the additional step of densifying said powder prior to rolling.

6. The method of claim 1 wherein said powder is beryllium.

7. The method of claim 5 wherein said densifying step comprises hydropressing.

8. The method of claim 5 wherein said densifying step comprises hot isostatic pressing.

9. The method of claim 5 wherein said densifying step comprises a combination of hydropressing and hot isostatic pressing.

10. A method of producing an integral seamless hollow cylindrical shape having longitudinal or transverse ribs comprising:
    (a) arranging a plurality of mandrels in spaced relation to one another between coaxial tubes;
    (b) filling at least the majority of the spaces between the mandrels and the tubes with a powder material, said powder material being different than the mandrel material;
    (c) filling any remaining spaces between the mandrels and the tubes with solid structural material, said solid material being the same as the powder material;
    (d) welding top and bottom end plates on the filled areas of the tubes;
    (e) ring rolling the tubular structure to a predetermined thickness; and
    (f) selectively removing the mandrels.

References Cited

UNITED STATES PATENTS

| | | | |
|---|---|---|---|
| 2,851,770 | 9/1958 | Fromson | 29—423 |
| 2,946,681 | 7/1960 | Probst | 75—208 |
| 3,044,160 | 7/1962 | Jaffee | 29—423 |
| 3,213,163 | 10/1965 | Brite | 264—.5 |
| 3,230,618 | 1/1966 | Valyi | 29—423 |
| 3,321,826 | 5/1967 | Lowy | 29—423 |
| 3,359,622 | 12/1967 | Meyer | 29—420.5 |

CARL D. QUARFORTH, Primary Examiner

A. J. STEINER, Assistant Examiner

U.S. Cl. X.R.

29—423; 75—208, 214

PO-1050
(5/69)

UNITED STATES PATENT OFFICE
CERTIFICATE OF CORRECTION

Patent No. 3,531,848      Dated October 6, 1970

Inventor(s) Paul J. Gripshover and Hugh D. Hanes

It is certified that error appears in the above-identified patent and that said Letters Patent are hereby corrected as shown below:

In the Specification:

Column 1, line 41, "as" should read -- or --.

Column 3, line 48, "presurized" should read -- pressurized --.

Column 5, line 28, should read
     -- Beryllium----------------Copper. --
("Beryllium" was omitted entirely and "Copper" appears as "Cooper".)

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents